(12) United States Patent
Tonegawa

(10) Patent No.: US 7,119,915 B2
(45) Date of Patent: Oct. 10, 2006

(54) COMMUNICATION APPARATUS AND METHOD

(75) Inventor: Nobuyuki Tonegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 09/790,108

(22) Filed: Feb. 21, 2001

(65) Prior Publication Data

US 2001/0033390 A1    Oct. 25, 2001

(30) Foreign Application Priority Data

Feb. 21, 2000 (JP) .............................. 2000-043185
Feb. 21, 2000 (JP) .............................. 2000-043186

(51) Int. Cl.
G06F 15/00 (2006.01)

(52) U.S. Cl. ...................... 358/1.15; 358/1.2; 358/402; 358/442; 382/298; 382/299; 379/100.12; 709/217

(58) Field of Classification Search ................ 358/1.2, 358/451, 528, 402, 405, 442, 1.15, 403, 407, 358/434, 401, 473; 382/298, 299, 261; 379/100.12, 379/100.13, 100.01; 709/206, 238, 239, 709/207; 348/211.3
See application file for complete search history.

(56) References Cited

U.S. PATENT DOCUMENTS

| | | | | |
|---|---|---|---|---|
| 4,918,542 A | * | 4/1990 | Nagashima et al. ......... | 358/451 |
| 5,294,998 A | * | 3/1994 | Piovoso et al. ............. | 382/261 |
| 5,461,488 A | | 10/1995 | Witek | |
| 5,463,295 A | * | 10/1995 | Inde ........................... | 358/442 |
| 5,465,160 A | * | 11/1995 | Kamo et al. ................ | 358/401 |
| 5,812,278 A | * | 9/1998 | Toyoda et al. .............. | 358/402 |
| 5,854,694 A | * | 12/1998 | Payne et al. ................ | 358/473 |
| 6,058,248 A | * | 5/2000 | Atkins et al. ................ | 358/1.2 |
| 6,141,695 A | | 10/2000 | Sekiguchi et al. | |
| 6,248,996 B1 | | 6/2001 | Johnson et al. | |
| 6,330,070 B1 | * | 12/2001 | Toyoda et al. ............. | 358/1.15 |
| 6,441,916 B1 | * | 8/2002 | Toyoda ....................... | 358/1.15 |
| 6,470,379 B1 | * | 10/2002 | Mori .......................... | 709/206 |
| 6,480,884 B1 | * | 11/2002 | Saito .......................... | 709/207 |

(Continued)

FOREIGN PATENT DOCUMENTS

JP    03-229566    10/1991

(Continued)

OTHER PUBLICATIONS

An English abstract for JP 03-229566 published on Oct. 11, 1991.

(Continued)

*Primary Examiner*—Kimberly Williams
*Assistant Examiner*—Beniyam Menberu
(74) *Attorney, Agent, or Firm*—Morgan & Finnegan, L.L.P.

(57) ABSTRACT

This invention provides a first communication apparatus, which makes a facsimile communication via a packet communication network and can describe different contents image header information each including a date, time, source information, destination information, and the like in image data having a predetermined number of pixels upon sending the image data to a plurality of destinations, and a communication method. This invention also provides a second communication apparatus which makes a facsimile communication via a packet communication network and has a first mode in which image header information such as a date, time, source information, destination information, and the like can be described in image data having a predetermined number of pixels and can send the image data, and a second mode in which image data having one of various resolutions and an indefinite number of pixels can be sent.

38 Claims, 13 Drawing Sheets

U.S. PATENT DOCUMENTS

| | | | |
|---|---|---|---|
| 6,587,219 B1 * | 7/2003 | Saito et al. | 358/1.15 |
| 6,590,673 B1 * | 7/2003 | Kadowaki | 358/1.15 |
| 6,594,032 B1 * | 7/2003 | Hiroki et al. | 358/1.15 |
| 6,750,902 B1 * | 6/2004 | Steinberg et al. | 348/211.3 |
| 6,836,789 B1 * | 12/2004 | Toyoda | 709/206 |
| 6,880,019 B1 * | 4/2005 | Toyoda | 709/238 |
| 6,963,417 B1 * | 11/2005 | Saito | 358/1.15 |
| 6,980,331 B1 * | 12/2005 | Mooney et al. | 358/400 |
| 7,050,188 B1 * | 5/2006 | Yajima et al. | 358/1.15 |
| 2001/0022669 A1 * | 9/2001 | Baba | 358/1.15 |
| 2002/0015175 A1 * | 2/2002 | Katsuda | 358/1.15 |
| 2002/0015182 A1 | 2/2002 | Atsushi et al. | |
| 2005/0099655 A1 * | 5/2005 | Tonegawa | 358/1.15 |

FOREIGN PATENT DOCUMENTS

| | | |
|---|---|---|
| JP | 04-369170 | 12/1992 |
| JP | 05-022568 | 1/1993 |
| JP | 05-504433 | 7/1993 |
| JP | 05-207263 | 8/1993 |
| JP | 05-219354 | 8/1993 |
| JP | 6-152917 | 5/1994 |
| JP | 11-212892 | 8/1999 |
| JP | 2000/222307 | 8/2000 |
| WO | WO 92/12495 | 7/1992 |

OTHER PUBLICATIONS

An Office Action from the Japanese Patent Office dated May 30, 2005 for basic Japanese Patent Application No. 2000-043186.

* cited by examiner

F I G. 6
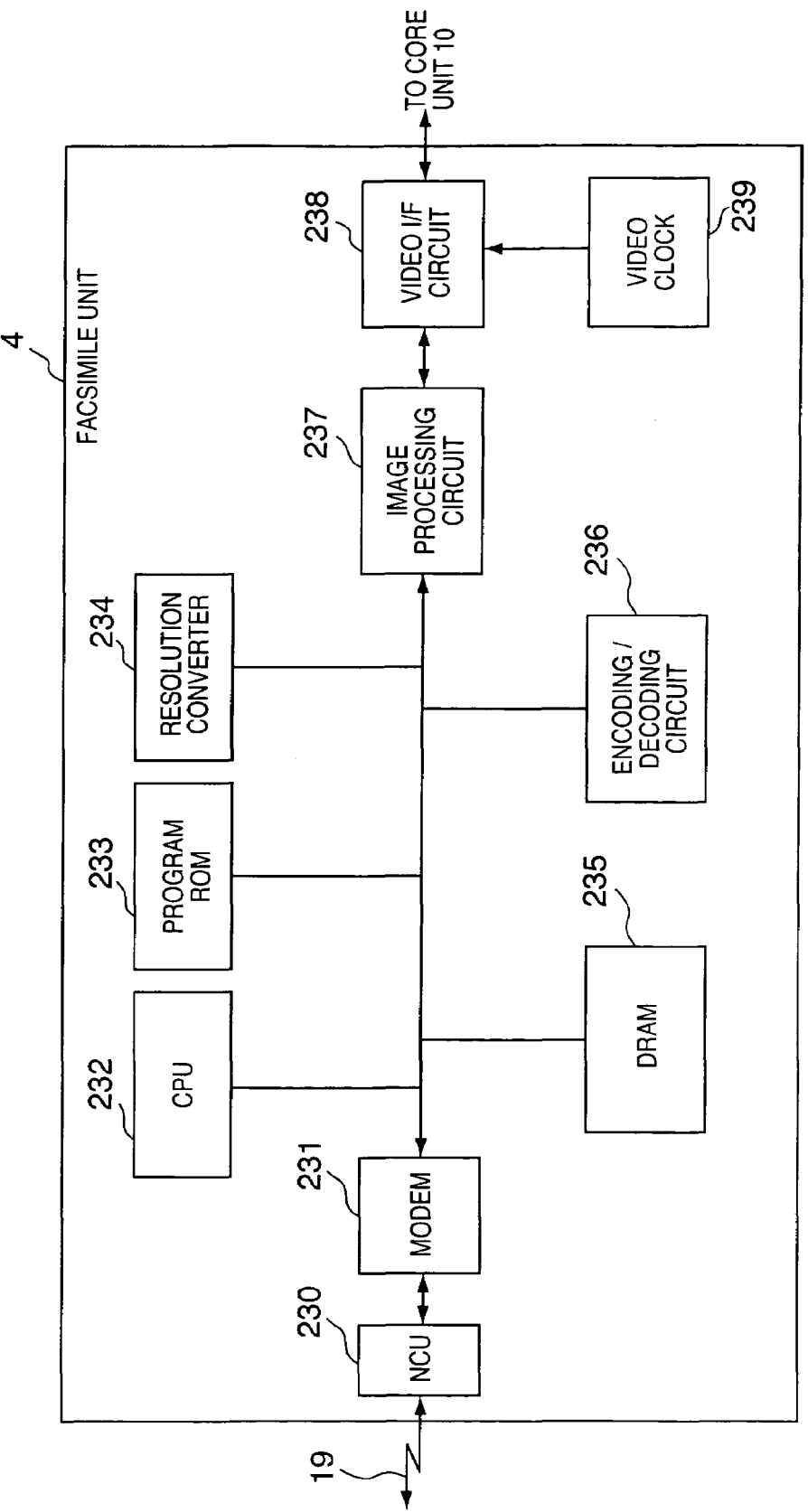

F I G. 12A

1999 06/08 20:21 IFAX figaro01@ccm.ganon.co.jp → TOKYO HOME OFFICE   001/003

F I G. 12B

1999 06/08 20:21 IFAX figaro01@ccm.ganon.co.jp → OSAKA BRANCH OFFICE   001/003

COMMUNICATION APPARATUS AND METHOD

FIELD OF THE INVENTION

The present invention relates to a communication apparatus and method for sending/receiving e-mail messages appended with image data.

BACKGROUND OF THE INVENTION

In recent years, as computers have prevailed and networked, e-mail messages used to send/receive character information via the Internet are prevalent. Files of various formats can be attached to e-mail messages in addition to e-mail text as character information.

There has also been proposed Internet FAX which sends/receives bitmap images by attaching as an attachment file of an e-mail message a TIFF (Tagged Image File Format) file in which information called a tag written with a recording format of data is prepared in the header of image data.

On the other hand, in FAX via a telephone line, sending information such as a date, time, source telephone number, destination name, and the like is often appended to the image header of image data to be sent.

FIG. 13 shows the conventional connection relationship among apparatuses associated with sending, receiving, and print processes of e-mail information. An example in which an e-mail message is sent from one of two computers installed with e-mail software for sending/receiving e-mail messages, i.e., from an e-mail client 11 to the other, i.e., an e-mail client 15 using an Internet 13 will be explained below using FIG. 13.

The e-mail client 11 inputs text comment of an e-mail message and destination information as the user name of the e-mail client 15 from an input unit such as a keyboard or the like, and sends the e-mail message to a Mail server·POP server 12 in accordance with SMTP (Simple Mail Transfer Protocol) as one of protocols used to transfer Internet mail messages between computers.

If there are a plurality of recipients, the SMTP allows the user to describe a plurality of destinations as destination information of a given mail message and to send the mail message to these recipients. A mail server group such as the Mail server·POP server 12 sends such mail message to all the destinations as independent mail message.

Upon receiving the e-mail message, the Mail server·POP server 12 determines based on the destination information of the received e-mail message that the destination of the e-mail message is a Mail server·POP server 14, and sends this e-mail message to the Mail server·POP server 14 via the Internet 13. Upon receiving the e-mail message, the Mail server·POP server 14 saves the received e-mail message in an e-mailbox.

The e-mail client 15 checks at given time intervals by e-mail software if a new e-mail message has come in the e-mailbox of the Mail server·POP server 14, in accordance with POP3 (Post Office Protocol-Version3) as one of protocols used to download the e-mail message delivered to that client via the Internet. If a new e-mail message has come in the e-mailbox, the e-mail client 15 downloads that e-mail message, and opens it, thus reading the e-mail message sent from the e-mail client 11. When text or an attachment file of the received e-mail message is to be printed, a printer driver or application installed in the e-mail client 15 is launched to print the e-mail text and attachment file using a printer 16.

On the other hand, image data read by an Internet FAX 18 in FIG. 13 is also sent to an Internet FAX 17 by the same method as that described above. More specifically, image data read by the Internet FAX 18 is sent to the Mail server·POP server 12, is then sent to the Mail server·POP server 14 via the Internet 13, and is saved in the Mail server·POP server 14. This image data is sent to the Internet FAX 17, and is printed by the Internet FAX 17.

In this case, when there are a plurality of recipients, the internet FAX 18 generates image data without describing any recipient information in the image header of the image data, and describes a plurality of destinations in destination information of an e-mail message to send identical information.

When an e-mail message attached with image data is sent in the conventional system mentioned above, the communication protocol of the e-mail message can simultaneously send the e-mail message to a plurality of destinations without describing any image header information in image data. However, when sending information pertains to a plurality of destinations such as a date, time, source information, destination names, and the like are described in the image header of image data, destination information cannot be described due to its large size.

When an e-mail message attached with image data is sent in the conventional system mentioned above, image data having a predetermined sending resolution and a predetermined number of pixels can be sent to a single destination while giving a date, time, source telephone number, destination name, and the like in its image header. However, when image data having one of various resolutions and an indefinite number of pixels is sent while giving sending information such as a date, time, source telephone number, destination name, and the like, the character size becomes unnaturally too large or small, or characters may fall outside a paper sheet.

SUMMARY OF THE INVENTION

The present invention has been made to solve the conventional problems, and has as its first object to provide a first communication apparatus, which provides facsimile communications via a packet communication network and can send image data having a predetermined number of pixels to a plurality of destinations by describing different contents of image header information such as a date, time, source information, destination information, and the like in the image data, a first communication method, and a storage medium that stores a communication control program for controlling that communication method.

It is the second object of the present invention to provide a second communication apparatus which provides facsimile communications via a packet communication network, and has a first mode capable of sending image data having a predetermined number of pixels by describing image header information such as a date, time, source information, destination information, and the like in the image data, and a second mode capable of sending image data having one of various resolutions and an indefinite number of pixels, its control method, and a storage medium that stores a communication control program for controlling that communication method.

In order to achieve the above objects, the first communication apparatus according to the present invention has the following arrangement. A communication apparatus for providing a facsimile communication via a packet communication network, comprises image data acquisition means for acquiring image data having a predetermined resolution, conversion means for converting the image data into image data having a predetermined number of pixels, sending information acquisition means for acquiring sending information of the image data, generation means for generating sending information image data using the sending information, and sending means for generating an e-mail message on the basis of the sending information, generating composite image data by combining the converted image data and the sending information image data, and sending the e-mail message attached with the composite image data.

In order to achieve the above objects, the first communication method according to the present invention has the following arrangement. A communication method for making a facsimile communication via a packet communication network, comprises the image data acquisition step of acquiring image data having a predetermined resolution, a conversion step of converting the image data acquired in the image data acquisition step into image data having a predetermined number of pixels, a sending information acquisition step of acquiring sending information of the image data, a generation step of generating sending information image data using the sending information acquired in the sending information acquisition step, and a sending step of generating an e-mail message on the basis of the sending information acquired in the sending information acquisition step, generating composite image data by combining the image data converted in the conversion step and the sending information image data, and sending the e-mail message attached with the composite image data.

In order to achieve the above objects, the first storage medium according to the present invention has the following arrangement. A storage medium stores a control program for a communication apparatus for making a facsimile communication via a packet communication network, and a control program comprises an image data acquisition step code of acquiring image data having a predetermined resolution, a conversion step code of converting the image data acquired in the image data acquisition step into image data having a predetermined number of pixels, a sending information acquisition step code of acquiring sending information of the image data, a generation step code of generating sending information image data using the sending information acquired in the sending information acquisition step, and a sending step code of generating an e-mail message on the basis of the sending information acquired in the sending information acquisition step, generating composite image data by combining the image data converted in the conversion step and the sending information image data, and sending the e-mail message attached with the composite image data.

In order to achieve the above objects, the second communication apparatus according to the present invention has the following arrangement. That is, a communication apparatus for providing a facsimile communication via a packet communication network, comprises mode detection means for detecting whether a first or second operation mode is designated, image data acquisition means for acquiring image data having a predetermined resolution, sending information acquisition means for acquiring sending information of the image data, conversion means for, when the first operation mode is detected, converting the image data into image data having a predetermined number of pixels, generation means for, when the first operation mode is detected, generating sending information image data using the sending information, and sending means for, when the first operation mode is detected, generating an e-mail message on the basis of the sending information, generating composite image data by combining the converted image data and the sending information image data, and sending the e-mail message attached with the composite image data, and for, when the second operation mode is detected, generating an e-mail message on the basis of the sending information, and sending the e-mail message attached with the image data.

In order to achieve the above objects, the second communication method according to the present invention has the following arrangement. A communication method for making a facsimile communication via a packet communication network, comprises the mode detection step of detecting whether a first or second operation mode is designated, an image data acquisition step of acquiring image data having a predetermined resolution, a sending information acquisition step of acquiring sending information of the image data, a conversion step of converting, when the first operation mode is detected, an image data into image data having a predetermined number of pixels, a generation step of generating, when a first operation mode is detected, sending information image data using the sending information acquired in the sending information acquisition step, and a sending step of generating, when the first operation mode is detected, an e-mail message on the basis of the sending information, generating composite image data by combining the converted image data and the sending information image data, and sending the e-mail message attached with the composite image data, and of generating, when a second operation mode is detected, generating an e-mail message on the basis of the sending information, and sending the e-mail message attached with the image data.

In order to achieve the above objects, a second storage medium according to the present invention has the following arrangement. A storage medium stores a control program for a communication apparatus for making a facsimile communication via a packet communication network, and a control program comprises a mode detection step code of detecting whether a first or second operation mode is designated, an image data acquisition step code of acquiring image data having a predetermined resolution, a sending information acquisition step code of acquiring sending information of the image data, a conversion step code of converting, when the first operation mode is detected, the image data into image data having a predetermined number of pixels, a generation step code of generating, when the first operation mode is detected, sending information image data using the sending information acquired in the sending information acquisition step, and a sending step code of generating, when the first operation mode is detected, an e-mail message on the basis of the sending information, generating composite image data by combining the converted image data and the sending information image data, and sending the e-mail message attached with the composite image data, and of generating, when the second operation mode is detected, generating an e-mail message on the basis of the sending information, and sending the e-mail message attached with the image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a block diagram of a facsimile unit in the communication apparatus according to the embodiment of the present invention;

FIGS. 12A and 12B show examples in which different contents of image header information are attached to image data to be sent by the communication apparatus according to the embodiment of the present invention.

DETAILED DESCRIPTION OF THE PREFERRED EMBODIMENTS

Preferred embodiments of the present invention will now be described in detail in accordance with the accompanying drawings.

Note that the scope of the present invention is not limited to the relative positions of building components, numerical values, and the like described in this embodiment unless otherwise specified.

<Arrangement of Internet FAX>

Figure 1:
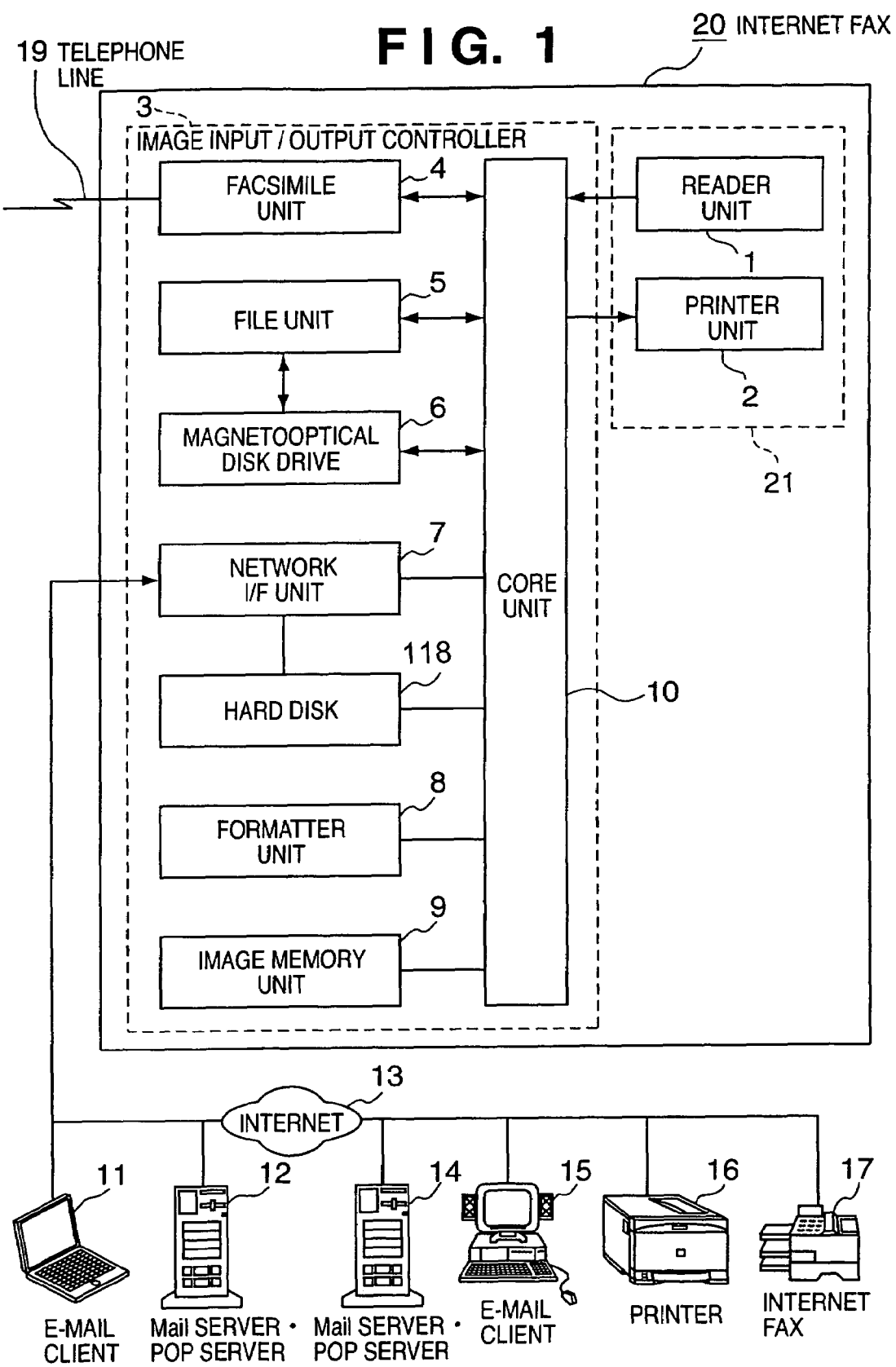
FIG. 1 is a block diagram showing the arrangement of a system using a communication apparatus according to an embodiment of the present invention.

FIG. 1 is a block diagram showing the arrangement of an Internet FAX 20 of this embodiment. As shown in FIG. 1, the Internet FAX 20 comprises a reader unit 1, printer unit 2, and image input/output controller 3.

The reader unit 1 reads a document image, and outputs image data corresponding to the document image to the printer unit 2 and image input/output controller 3. The printer unit 2 prints an image corresponding to image data sent from the reader unit 1 and image input/output controller 3 on a print sheet.

The image input/output controller 3 comprises a facsimile unit 4, file unit 5, network I/F (network interface) unit 7, formatter unit 8, image memory unit 9, and core unit 10, and is connected to the reader unit 1 and a telephone line 19.

The facsimile unit 4 is connected to the telephone line 19, expands compressed image data received via the telephone line 19, and sends expanded image data to the core unit 10. Also, the facsimile unit 4 compresses image data sent from the core unit 10, and sends the compressed image data onto the telephone line 19.

The file unit 5 is connected to a magnetooptical disk drive 6 and the core unit 10, compresses image data sent from the core unit 10, and writes the compressed image data in a magnetooptical disk set in the magnetooptical disk drive 6 together with a search keyword. Conversely, the file unit 5 searches compressed image data stored in the magnetooptical disk on the basis of a keyword sent from the core unit 10, expands the compressed image data found by search, and sends the expanded image data to the core unit 10.

The network I/F unit 7 is an interface for connecting the image input/output controller 3 to the network, to which an e-mail client 11, Mail server·POP server 12, and Internet 13 that spreads all over the world are connected. The network I/F unit 7 is also connected to a hard disk 118, and various data received in the Mail format via the network are sent to and saved in the hard disk 118.

The formatter unit 8 rasterizes code data which is sent from a computer connected to the Internet 13 or the like via the network I/F unit 7 and converts an image into printable image data, and sends that image data to the printer unit 2.

The image memory unit 9 temporarily stores image data. The core unit 10 has a role of controlling the data flow in respective blocks of the reader unit 1, facsimile unit 4, file unit 5, network I/F unit 7, formatter unit 8, and image memory unit 9.

Note that various e-mail servers such as a Mail server·POP server 14, e-mail client 15, and a printer 16 and an Internet FAX 17 are connected to the Internet 13, as shown in FIG. 1, and e-mail message can be exchanged among many people via these e-mail servers.

<Arrangement of Image Input/output Device>

Figure 2:
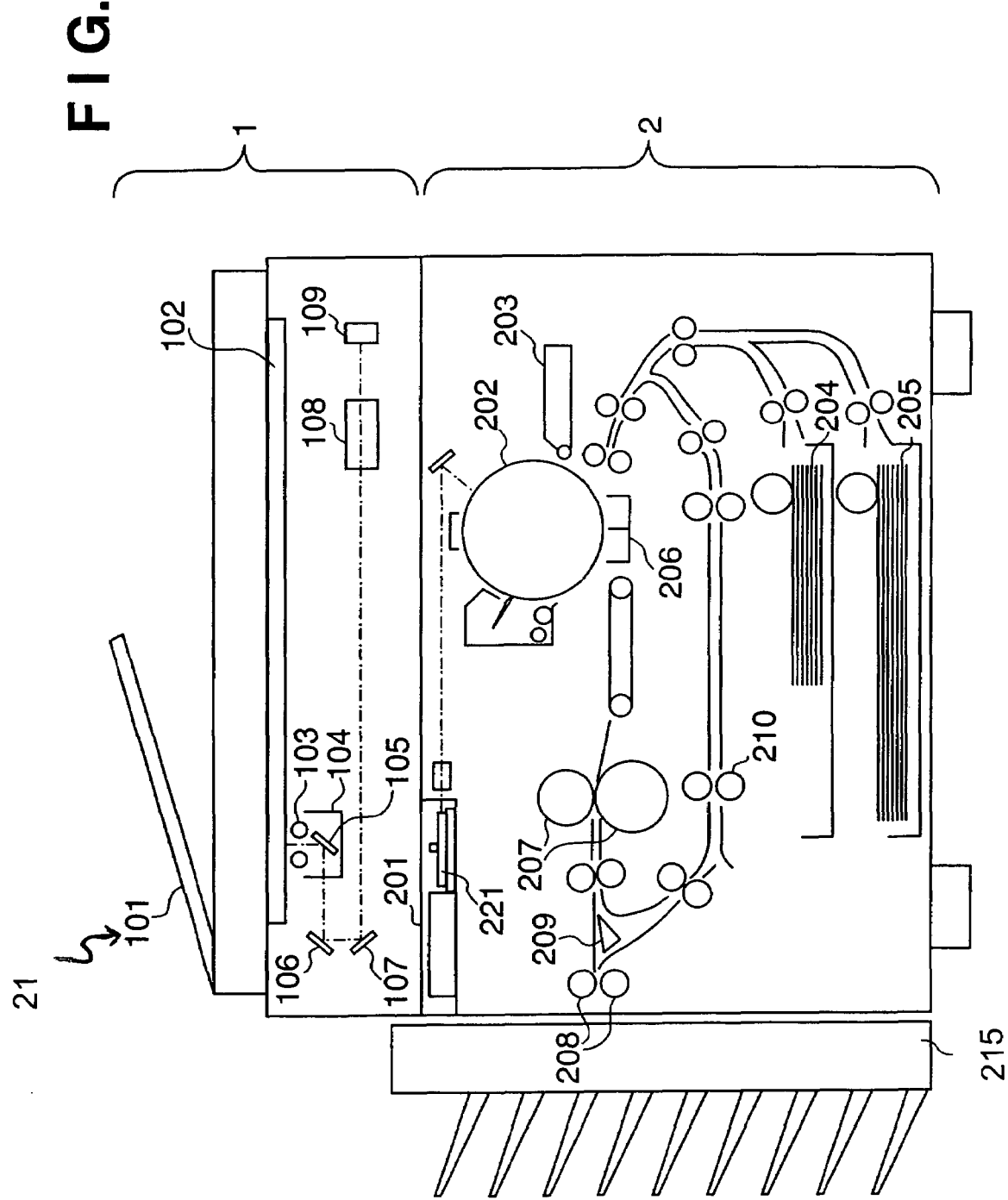
FIG. 2 is a sectional view showing the arrangement of an image input/output device unit of the communication apparatus according to the embodiment of the present invention.

FIG. 2 is a sectional view showing the arrangement of an image input/output device 21 that integrates the reader unit 1 and printer unit 2. The arrangement of the reader unit 1 and printer unit 2 will be described below using FIG. 2.

When a document feeder 101 mounted on the reader unit 1 feeds documents one by one in turn from the last page onto a platen glass 102, a lamp 103 is turned on, and a scanner unit 104 begins to move. Upon movement of the scanner unit 104, a document is scanned by exposure. Light reflected by the document upon exposure scan is guided to a CCD image sensor (to be referred to as a CCD hereinafter) 109 via mirrors 105, 106, and 107 and a lens 108. The scanned document image is optically read by the CCD 109 and is photoelectrically converted into image data to be output from the CCD 109. The output image data undergoes a predetermined process, and is then sent to the printer unit 2 and the core unit 10 of the image input/output controller 3 via a video bus (not shown). Note that the document is exhausted from the surface of the platen glass 102 after the end of scan.

Image data output from the reader unit 1 is input to a laser driver 201 of the printer unit 2. The laser driver 201 drives a laser emission unit 221 to emit a laser beam on the basis of the input image data. The laser beam emitted by driving the laser emission unit 221 hits the surface of a photosensitive drum 202 while being scanned, thus forming an electrostatic latent image on the surface of the photosensitive drum 202 based on the laser beam. The electrostatic latent image formed on the photosensitive drum 202 is developed by a developing agent supplied from a developer 203.

Simultaneously with the beginning of laser beam irradiation, a print sheet P (not identified) is fed from one of cassettes 204 and 205. The print sheet P is fed to the gap between the photosensitive drum 202 and a transfer unit 206, and the developing agent image formed on the surface of the photosensitive drum 202 is transferred onto the fed print sheet P by the transfer unit 206. The print sheet P is conveyed to a fixing unit 207, and the developing agent image is fixed on the print sheet P by a heat compression process of the fixing unit 207. The print sheet P is exhausted by exhaust rollers 208 and is stored in a corresponding bin by a sorter 215.

In a default setup, i.e., if no specific sorting mode is set in the sorter 220, the print sheet P is stored in the uppermost bin. When a double-sided print mode on the print sheet P is set, after the print sheet is conveyed to the position of the exhaust rollers 208, the rotational direction of the exhaust rollers 208 is reversed to guide the print sheet to a re-feed convey path 210 by a flapper 209.

When a multiple print mode is set, the flapper 209 is switched not to convey the print sheet P to the exhaust rollers 209 but to guide it the re-feed convey path 210. The print sheet P guided to the re-feed convey path 210 is fed again to the gap between the photosensitive drum 202 and transfer unit 206 at the aforementioned timing.

<Arrangement of Reader Unit>

Figure 3:
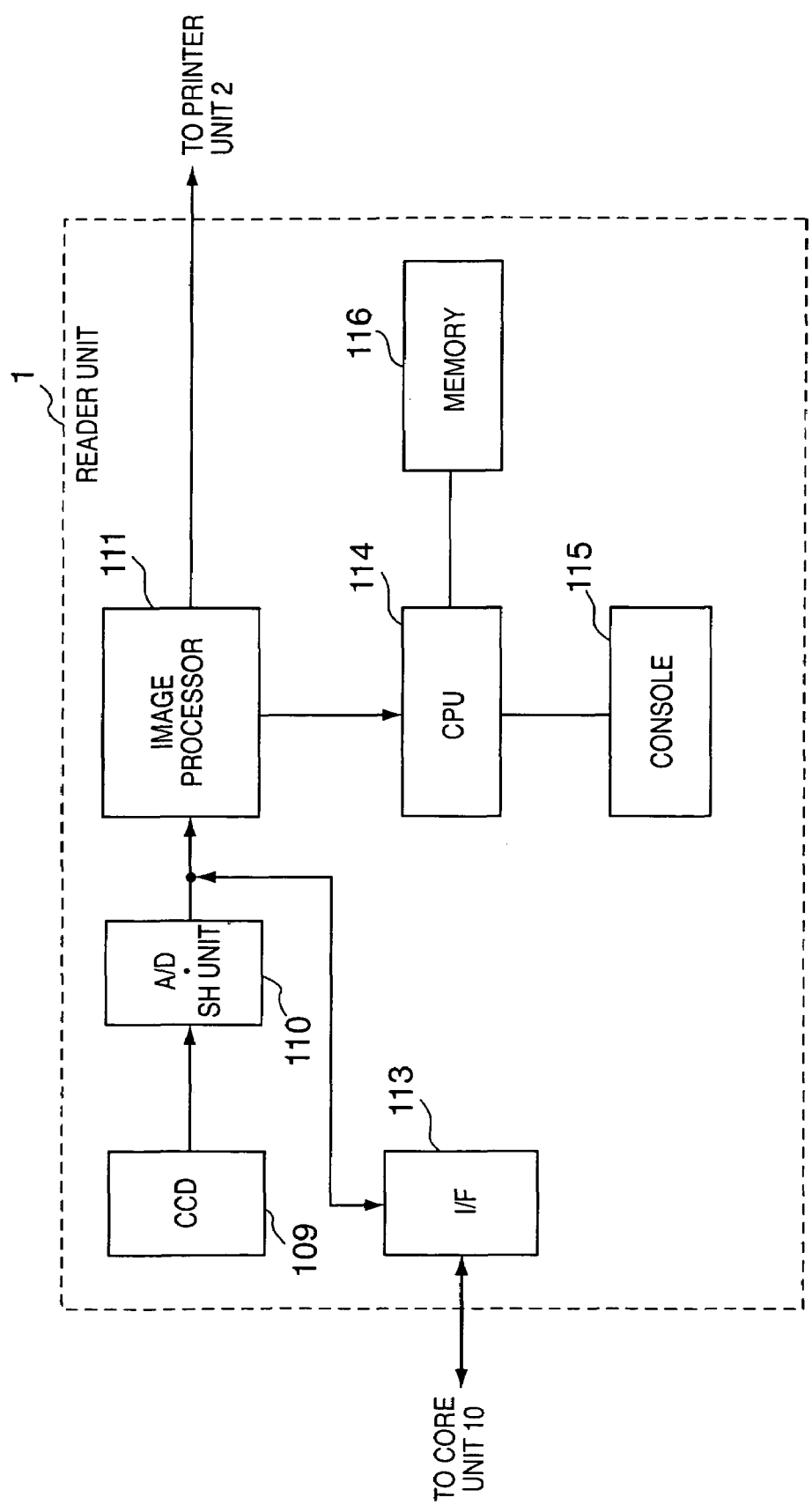
FIG. 3 is a block diagram showing the arrangement of a reader unit of the communication apparatus according to the embodiment of the present invention.

FIG. 3 is a block diagram showing the arrangement of the reader unit 1 of the Internet FAX 20. The arrangement of the reader unit 1 will be described below using FIG. 3. Image data output from the CCD 109 is A/D-converted into digital data by an A/D·SH unit 110, and the digital data then undergoes a shading correction process. The processed digital data is sent to an image processor 111 or an I/F (interface) 113.

Data containing image data sent to the image processor 111 is selectively sent to the printer unit 2 or a CPU 114, or to the I/F 113. When the image processor 111 sends data containing image data to the I/F 113, that data is further sent from the I/F 113 to the core unit 10. Note that the I/F 113 may also send data containing image data sent from the core unit 10 to the image processor 111.

Note that data containing image data sent to the image processor 111 and I/F 113 is controlled by the CPU 114 on the basis of setup contents at a console 115. For example, when a "trimming copy mode" for copying after a trimming process is set at the console 115, the CPU 114 controls the image processor 111 to execute the trimming process, and then instructs to send data containing the image data which has undergone the trimming process to the printer unit 2.

On the other hand, when a "facsimile sending mode" is set at the console 115, the CPU 114 instructs to send image data and control commands of the "facsimile sending mode" to the core unit 10 via the I/F 113 in accordance with a control program stored in a memory 116. In this case, the memory 116 is also used as a work area of the CPU 114.

<Arrangement of Core Unit>

Figure 4:
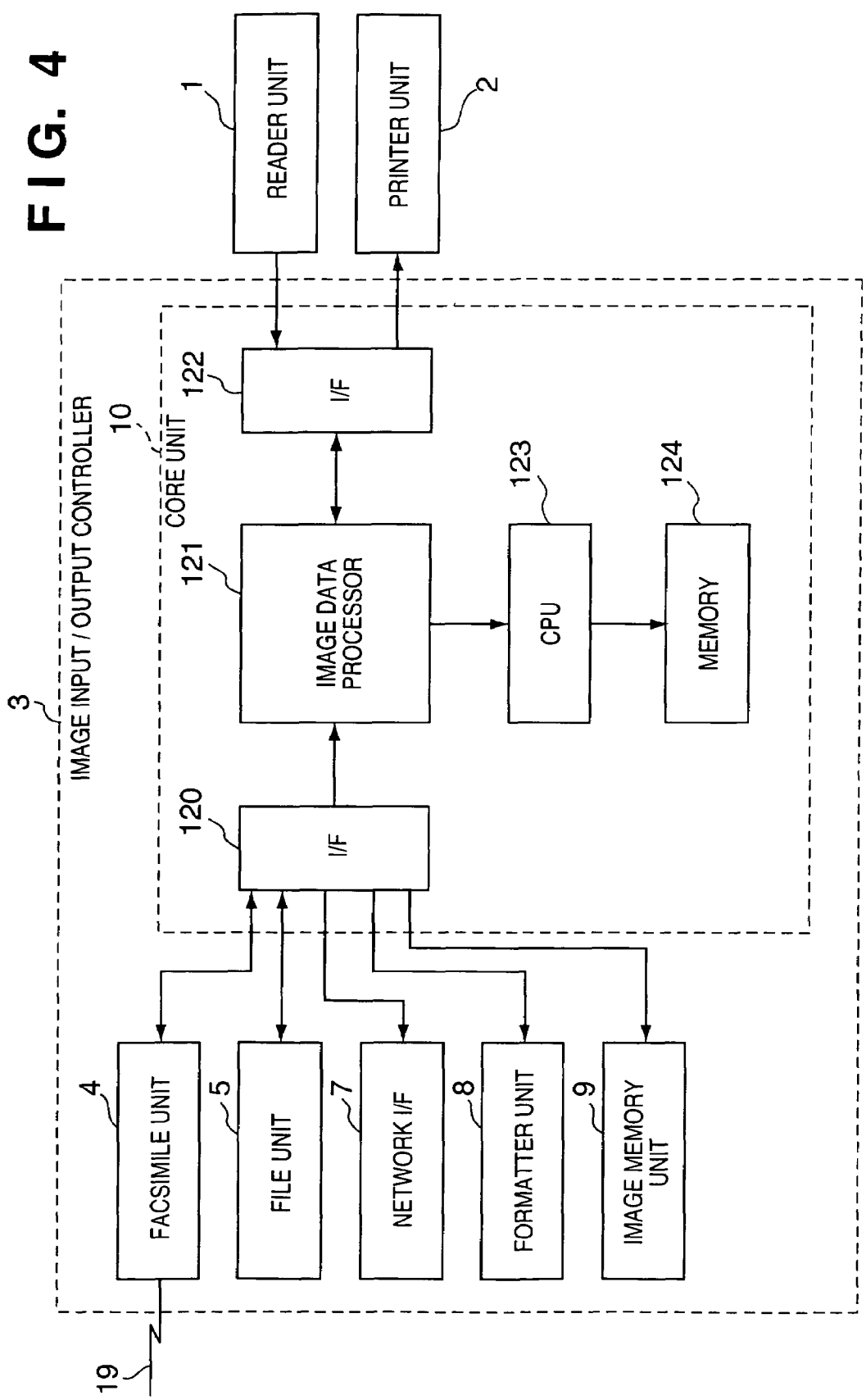
FIG. 4 is a block diagram showing the arrangement of a core unit in the communication apparatus according to the embodiment of the present invention.

FIG. 4 is a block diagram showing the arrangement of the core unit 10 of the image input/output controller 3. The core unit 10 has an I/F 122 with the reader unit 1, sends image data of data containing image data sent from the reader unit 1 to an image data processor 121 via the I/F 122, and sends control commands sent from the reader unit 1 to a CPU 123.

The image data processor 121 executes image processes such as an image rotation process, zoom process, and the like of the received image data as needed, and sends the image data that has undergone the image processes to the facsimile unit 4, file unit 5, or network I/F unit 7 via an I/F 120 on the basis of the control commands sent from the reader unit 1. Also, the image data processor 121 sends print data which is received via the network I/F unit 7 and represents an image to the formatter unit 8 to rasterize it to image data, and sends the image data to the facsimile unit 4 or to the printer unit 2 via the I/F 122.

On the other hand, image data received by the facsimile unit 4 is sent to the image data processor 121, which sends it to the printer unit 2, file unit 5, or network I/F unit 7. Furthermore, image data sent from the file unit 5 is sent to the image data processor 121, which sends it to the printer unit 2, facsimile unit 4, or network I/F unit 7.

The CPU 123 controls sending of data among blocks, and execution of image processes by the image data processor 121 in accordance with a control program stored in a memory 124 and control commands sent from the reader unit 1. The memory 124 is also used as a work area of the CPU 123.

The Internet FAX 20 of this embodiment is a communication apparatus which executes processes for reading a document image, printing an image, sending/receiving an image, saving an image, and exchanging data with a computer, and so on around the core unit 10.

<Operation of Formatter Unit>

Figure 5:
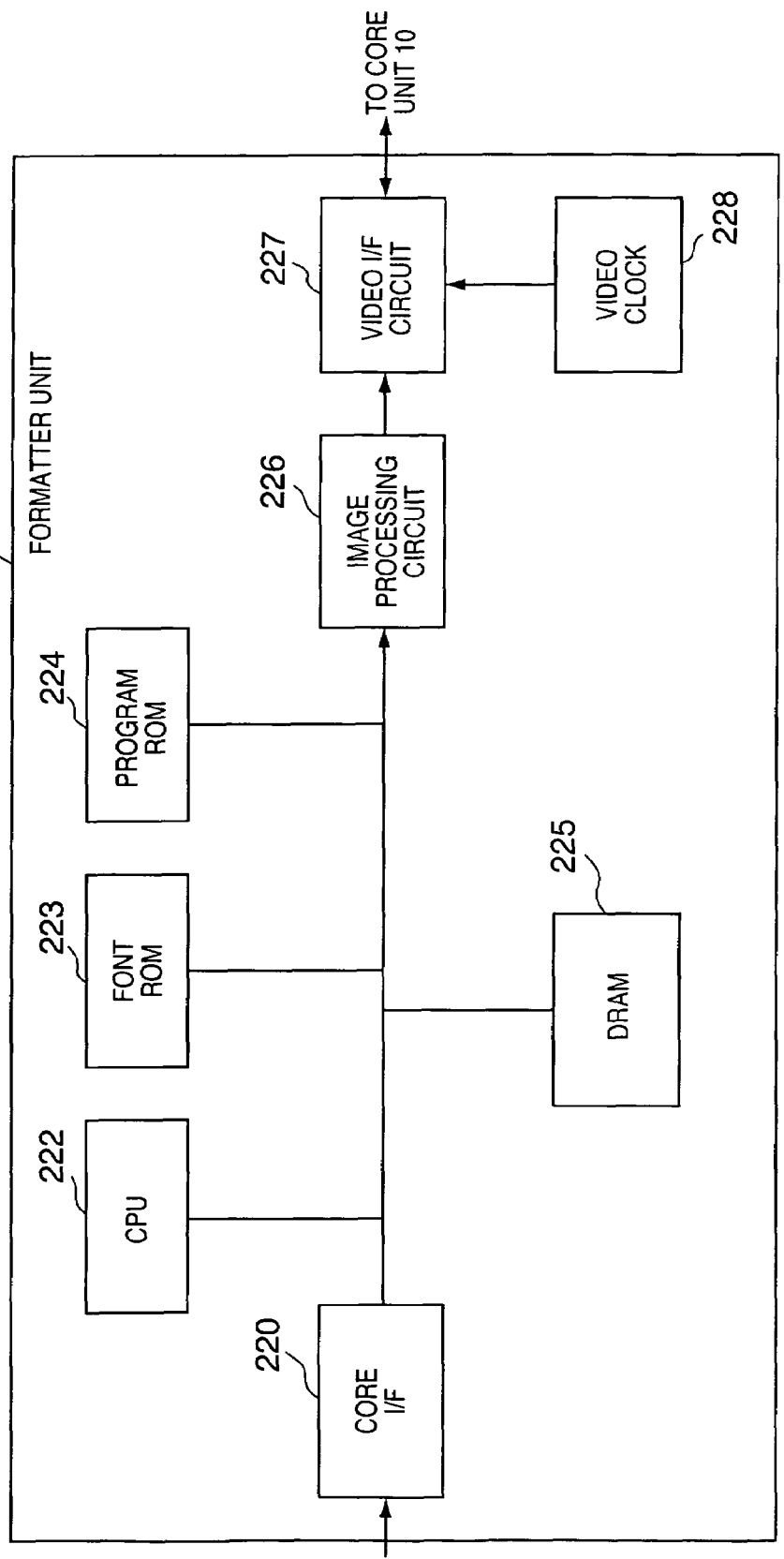
FIG. 5 is a block diagram showing the arrangement of a formatter unit in the communication apparatus according to the embodiment of the present invention.

FIG. 5 is a block diagram for explaining the operation of the formatter unit 8. Data created by an application such as wordprocessing software or the like of the e-mail client 11 is converted by a printer driver into a page description language (PDL) such as Postscript (which copes with both text and graphics and can output text and graphics with high quality irrespective of the printer resolution) or the like that a printer can print. The converted data is sent to the formatter 8 via the network I/F unit 7, the core unit 10, and a core I/F 220. In the formatter unit 8, a CPU 222 interprets the received converted data, and converts it into image data using a Font ROM 223 and DRAM 225. Upon receiving this image data, an image processing circuit 226 executes a process on the image data in synchronism with a sync signal generated by a video clock 228, and then sends the image data to the core unit 10 via a video I/F 227. The sent image data is printed by the printer unit 2. A program ROM 224 stores a program for controlling the aforementioned operation. In this manner, PDL data such as Postscript data or the like that a printer can print can be printed.

Note that the formatter unit 8 can be changed in units of PDLs, the program ROM 224 differs in units of PDLs and their versions, and the user can select a PDL and its version according to user's purpose.

<Operation of Facsimile Unit>

FIG. 6 is a block diagram for explaining the operation of the facsimile unit 4. An NCU (Network Control Unit) 230 is a circuit for connecting a FAX to a telephone set, i.e., a circuit for switching a line between the telephone set and FAX by off-hook state of a handset upon receiving a call, detecting a ringing signal upon reception, and holding a DC loop signal from a telephone exchange during telephone conversation. A MODEM (MOdulator/DEModulator) 231 is a modulation/demodulation circuit for converting an analog signal into a digital signal or vice versa.

<Flow of Received Image Data>

The flow of image data will be described below. Image data to be received will be explained first. Image data sent from another FAX is received by the NCU 230, and is converted by the MODEM 231 into a digital signal. The converted digital data is data obtained by encoding image data by MH (Modified Huffman) coding, MR (Modified Read) coding, MMR (Modified Modified Read) coding, JBIG (Joint Bi-level Image Coding Experts Group) coding, or the like. The converted digital data is decoded by an encoding/decoding circuit 236, and the decoded data is saved in a DRAM 235. The decoded image data undergoes resolution conversion by a resolution converter 234, and then undergoes an image process by an image processing circuit 237. The data that has undergone the image process is sent to the core unit 10 via a video I/F 238 in synchronism with a clock generated by a video clock 239, and is printed by the printer unit 2.

<Flow of Sent Image Data>

The flow of image data to be sent will be explained below. When sending, image data read by the reader unit 1 is rasterized on the DRAM 235 via the core unit 10, video I/F 238, and image processing circuit 237 in synchronism with a clock generated by the video clock 239. This data undergoes resolution conversion by the resolution converter 234, and is encoded by MH, MR, MMR, or JBIG by the encoding/decoding circuit 236. The encoded data is converted into an analog signal by the MODEM 231, and the analog signal is sent by the NCU (Network Control Unit) 230.

Note that a CPU 232 controls the aforementioned operation, and a program ROM 233 stores a program for operating the CPU 232. Note that the facsimile unit 4 is detachable, and can be attached in correspondence with user's purpose.

<Program Configuration of Network I/F Unit>

Figure 7:
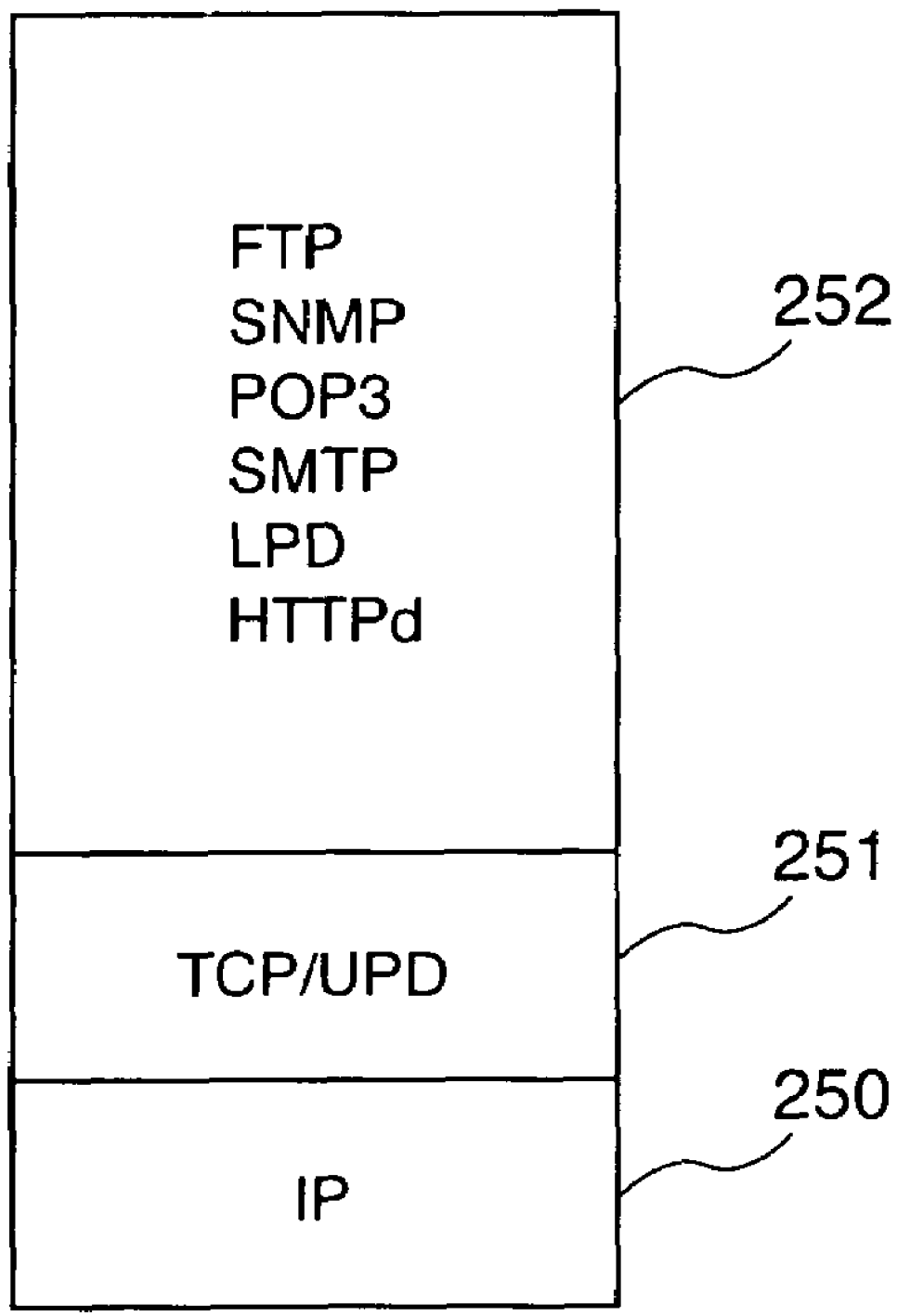
FIG. 7 shows the program configuration in a network I/F unit in the communication apparatus according to the embodiment of the present invention.

FIG. 7 shows the program configuration in the network I/F unit 7 of the Internet FAX 20.

The network I/F unit 7 is comprised of operation programs of an IP (Internet Protocol) 250 as a protocol of the network layer, a TCP (Transmission Control Protocol)/UDP (User Datagram Protocol) 251 as a protocol of the transport layer, and an application layer protocol 252 as a protocol of the application layer.

The IP 250 is the Internet protocol for providing a service for delivering a message from a source host to a destination host in collaboration with relay nodes such as a router and the like. The most important information upon delivering a message is source and destination addresses, which are managed by the IP 250. The IP 250 also provides routing for determining a route in the network along which a message is to be delivered to the destination host in accordance with address information.

The TCP/UDP 251 is the protocol of the transport layer that provides a service for delivering a message from a sending application process to a receiving application process. As the difference between the TCP and UDP, the TCP is a connection type service and guarantees high reliability of communications, but the UDP is a connectionless type service which does not guarantee reliability.

The application layer protocol 252 specifies a plurality of protocols, which include FTP (File Transfer Protocol) as a file sending service, SNMP as a network management protocol, LPD as a server protocol for a printer print process, HTTPd as a protocol of a WWW (World Wide Web) server, SMTP (Simple Mail Transfer Protocol) as an e-mail sending/receiving protocol, POP3 (Post Office Protocol-Version3) as an e-mail download protocol, and the like.

<Reception and Print of E-mail Message by Internet FAX>

A method of receiving an e-mail message sent from the e-mail client shown in FIG. 1 by the Internet FAX 20 via the Internet 13, and printing the received e-mail message will be explained below. Assume that the e-mail client 15 is installed with e-mail software for sending/receiving e-mail messages in advance.

In FIG. 1, the e-mail client 15 inputs e-mail text and destination information as an e-mail address of the Internet FAX 20 from, e.g., a keyboard so as to send an e-mail message to the Internet FAX 20. The e-mail client 15 then sends the e-mail message to the Mail server·POP server 14 in accordance with SMTP (Simple Mail Transfer Protocol).

Upon receiving the e-mail message, the Mail server·POP server 14 determines based on its destination information that the destination is the Mail server·POP server 12, and sends the e-mail message to the Mail server·POP server 12 via the Internet 13.

The sent e-mail message is received by the Mail server·POP server 12. If the e-mail address of the received e-mail message directly designates the Internet FAX 20, the received e-mail message is sent to the Internet FAX 20 using the SMTP protocol. On the other hand, if the e-mail address of the received e-mail message designates an e-mailbox in the Mail server·POP server 12, the received e-mail message is stored in the e-mailbox.

<Reception and Print of E-mail Message by Internet FAX>

Figure 8:
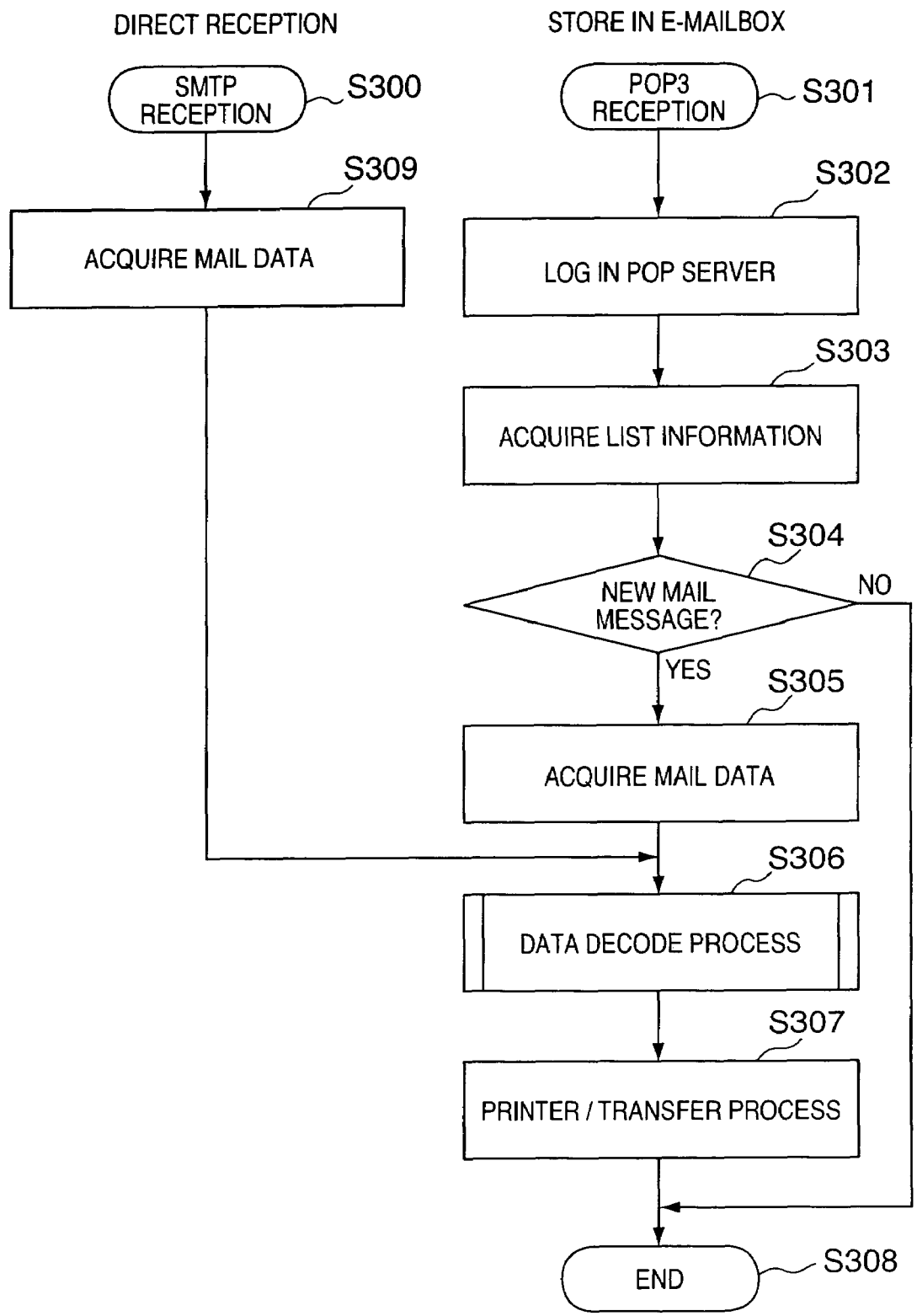
FIG. 8 is a flow chart showing an e-mail reception process in the communication apparatus according to the embodiment of the present invention.

FIG. 8 is a flow chart showing the operation from reception to print of an e-mail message by the aforementioned Internet FAX. Upon receiving an e-mail message in accordance with SMTP in step S300, an e-mail message is acquired in accordance with the SMTP protocol in step S309. The flow then advances to step S306 to decode the received e-mail data.

On the other hand, POP3 reception is periodically launched to check if an e-mail message has come in the e-mailbox in the Mail server·POP server 12 designated by the e-mail address. In step S301, the POP3 reception is launched to generate an interrupt.

Upon launching POP3 reception in step S301, the POP3 reception logs in the Mail server·POP server 12 in step S302 and acquires list information of e-mail messages saved in the e-mailbox in the POP server in step S303. In step S304, list information acquired when the POP3 reception was launched previously and logged in is compared with that acquired by the current login to check if the current list information includes a newly added e-mail message.

If it is determined in step S304 that no newly added e-mail message is present, the flow jumps to step S308 to end a series of operations of the POP3 reception. If a newly added e-mail message is found in step S304, the flow advances to step S305 to acquire e-mail data in accordance with the POP3 protocol, and the acquired data is then decoded in step S306.

Figure 9:
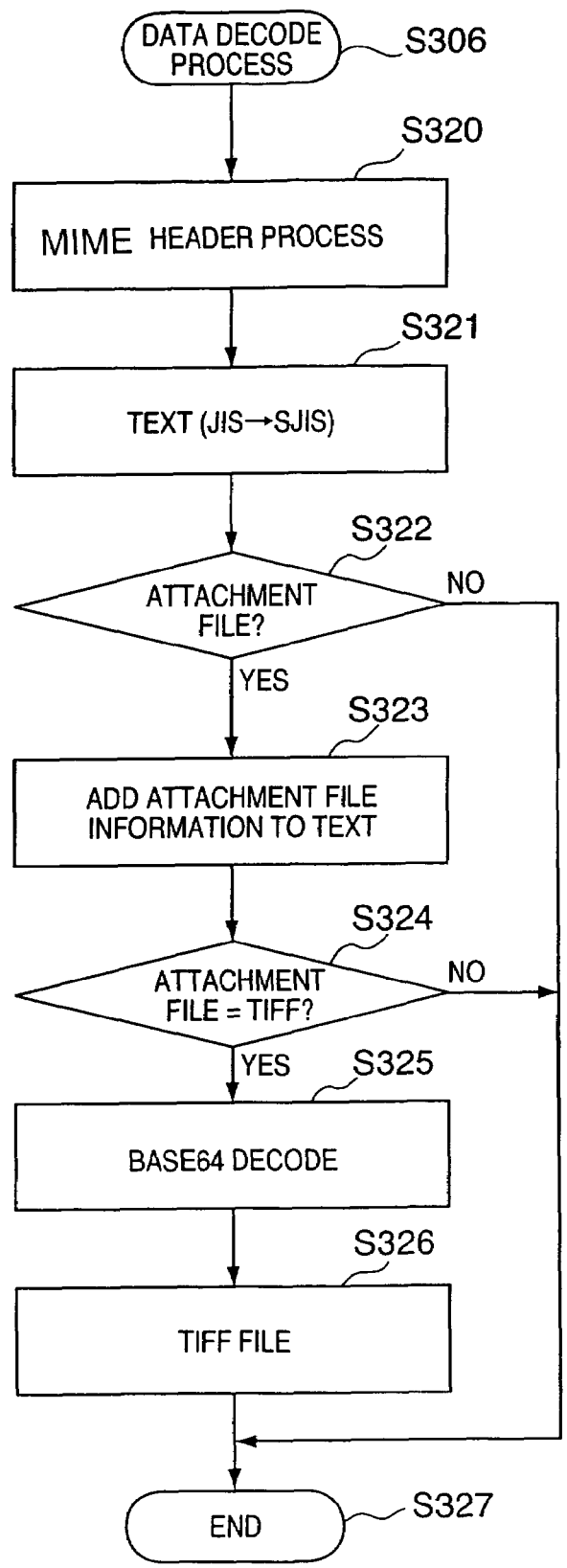
FIG. 9 is a flow chart showing a data decode process upon receiving an e-mail message in the communication apparatus according to the embodiment of the present invention.

In step S306, the received e-mail data is decoded to a source file format using the aforementioned SMTP or POP3 protocol, as will be described later using FIG. 9. In step S307, a print or transfer process is executed using the decoded data. The print process instructs the printer unit 2 to print, and the transfer process instructs to transfer data to a sending device such as the facsimile unit 4 or the like, thus ending a series of operations.

In step S307, the acquired e-mail data is printed or transferred. In addition, an e-mail information list may be displayed on the console 115. When an e-mail message displayed in the list is selected, the contents of the selected e-mail message may be displayed on the console 115 or may be printed or transferred.

<Data Decode Upon Receiving E-mail Message>

The data decode process in step S306 in FIG. 8 will be described in detail below using the flow chart in FIG. 9 which shows the data decode process of received data upon receiving an e-mail message. In step S320, a MIME header process for restoring the received e-mail message to source binary data is executed to determine the e-mail language used.

If it is determined that the e-mail message is written in Japanese using JIS codes, the e-mail message is converted into SJIS codes in step S321, so that printed text can be read as Japanese text. The flow then advances to step S322, and the contents described in the MIME header are discriminated to check if the e-mail message includes an attachment file. If no attachment file is attached to the e-mail message in step S322, the flow jumps to step S327, thus ending the data decode process.

On the other hand, if an attachment file is attached to the e-mail message in step S322, text that describes the file name like "attachment file: test.tif" is appended to e-mail text to inform the user of the presence of an attachment file in e-mail text in step S323.

It is checked in step S324 if the attachment file described in the MIME header is a TIFF (tagged image file format) file as a file format for saving a bitmap image. If the attachment file is not a TIFF file, the series of operations end. On the other hand, if the attachment file is a TIFF file in step S324, data encoded by BASE64 in the MIME header, i.e., 6-bit data for 4 bytes, is converted into 8-bit data for 3 bytes, thus decoding BASE64 as a data conversion format used to send mail message via the Internet in step S325. In step S326, a TIFF file is created, thus ending the series of operations.

<E-mail Sending Mode>

Figure 10:
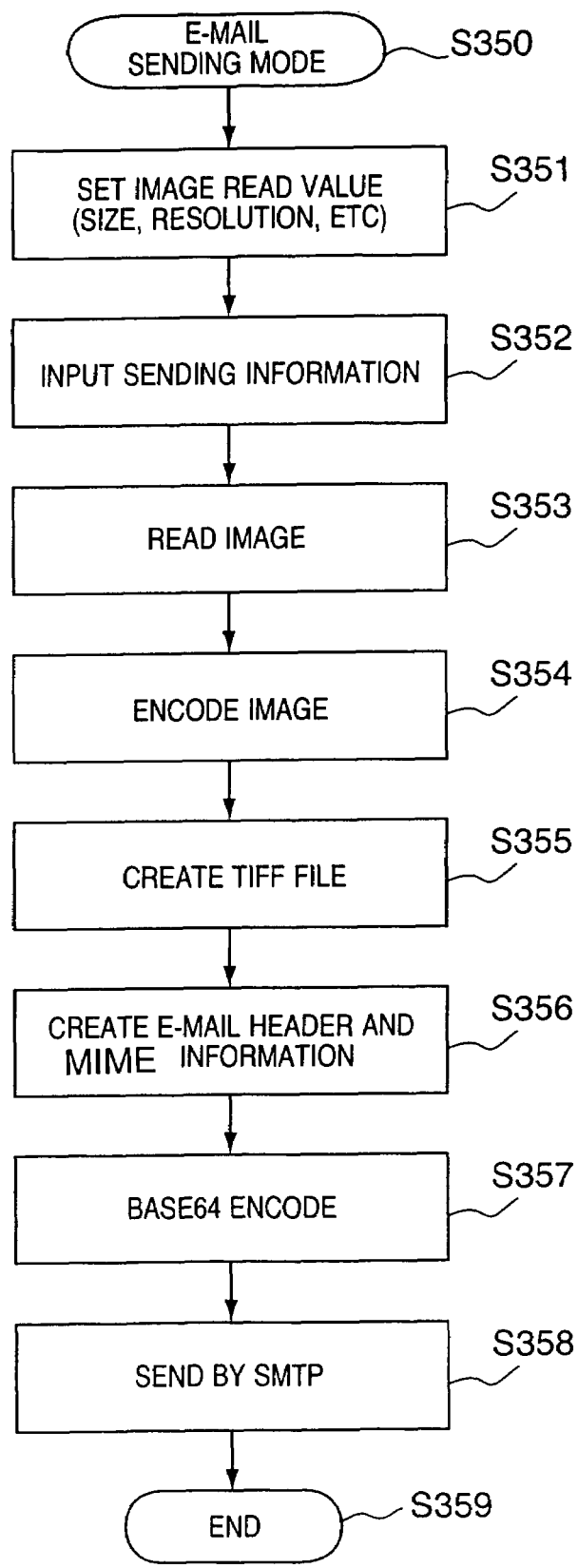
FIG. 10 is a flow chart of an e-mail sending mode in the communication apparatus according to the embodiment of the present invention.

FIG. 10 is a flow chart showing the "e-mail sending mode" of the Internet FAX 20. In the "e-mail sending mode", the Internet FAX 20 of the present invention inputs sending information including a date, time, destination address, source information, comment, and the like and attaches image data read via a scanner as an attachment file of an e-mail message, thus sending that e-mail message to the e-mail client 15 or the like via the Internet 13. The flow chart of the "e-mail sending mode" will be described below.

If the "e-mail sending mode" is selected in step S350, the Internet FAX 20 instructs the reader unit 1 to set setup values for reading image data in step S351. Note that the parameters that can be set as setup values include, e.g., a setup of image read size (A5, B5, A4, B4, A3), a setup of color/monochrome switching, a setup of resolution (100 dpi to 600 dpi), a setup of text/photo/text-photo mode switching, a setup of double-sided/single-sided document switching, and the like.

In step S352, the Internet FAX 20 instructs to input sending information required for sending image data such as a date, time, destination address, source information, comment, and the like at the console 115. In step S353, the Internet FAX 20 further instructs the reader unit 1 to scan a document set on the platen glass 102 and to read image data. The Internet FAX 20 instructs to compress the read image data by the MH format in step S354, and to create a TIFF file in step S355. In step S356, the Internet FAX 20 instructs to create an e-mail header and MIME information using the destination address, e-mail text data, and attachment TIFF file information. If a plurality of destinations to which an e-mail message is sent are selected, the Internet FAX 20 instructs to describe a plurality of destination addresses in the To: field of the e-mail header upon creating the e-mail header. In step S357, the Internet FAX 20 instructs to encode the TIFF file attached to the e-mail message using BASE64. In step S358, the Internet FAX 20 instructs to attach the data created in the aforementioned sequence to an e-mail message that describes a plurality of destination addresses in accordance with the SMTP protocol, and to send the e-mail message. The flow then advances to step S359 to end a series of operations.

<Internet FAX Sending Mode>

Figure 11:
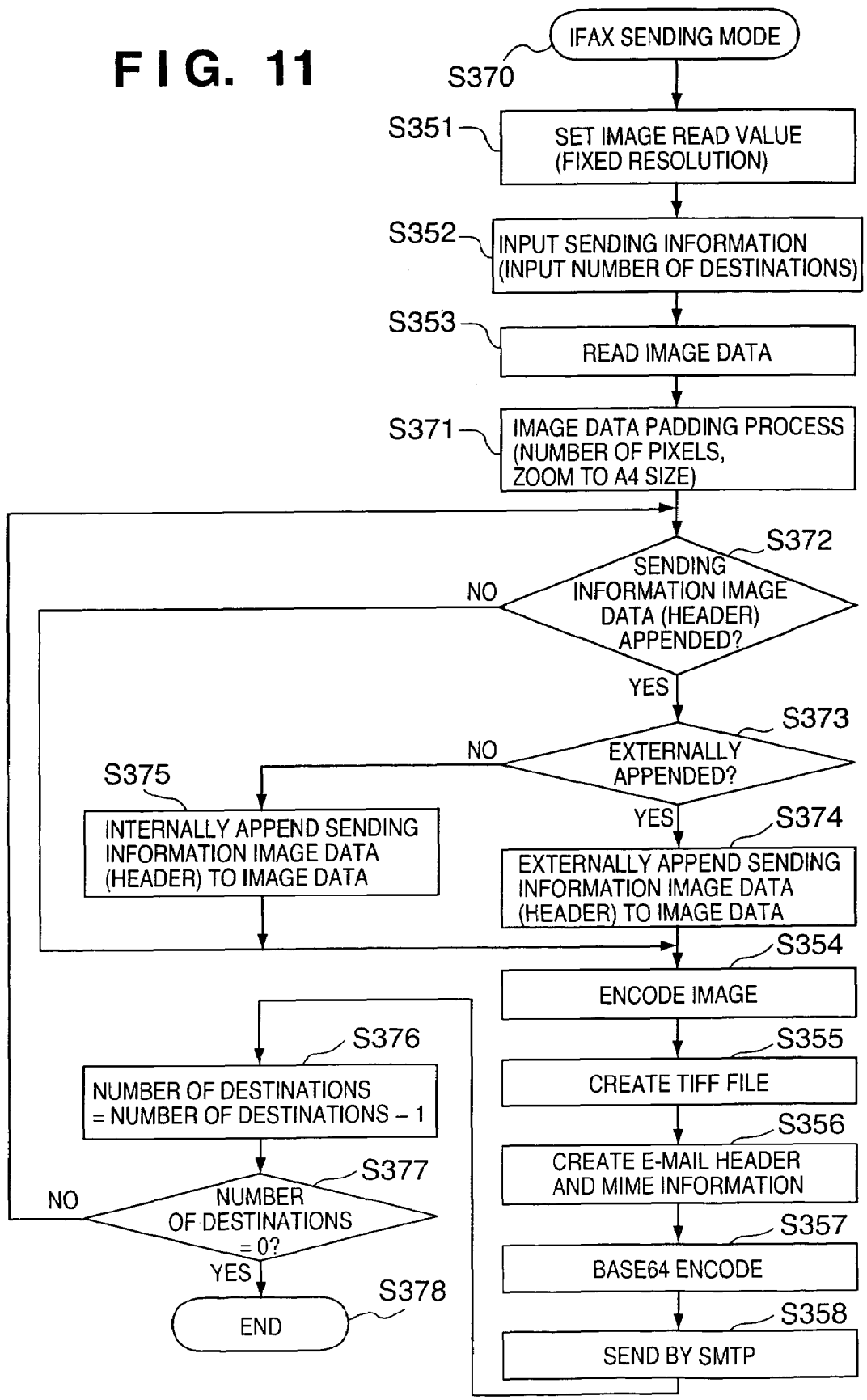
FIG. 11 is a flow chart of an Internet FAX sending mode in the communication apparatus according to the embodiment of the present invention.
Figure 13:
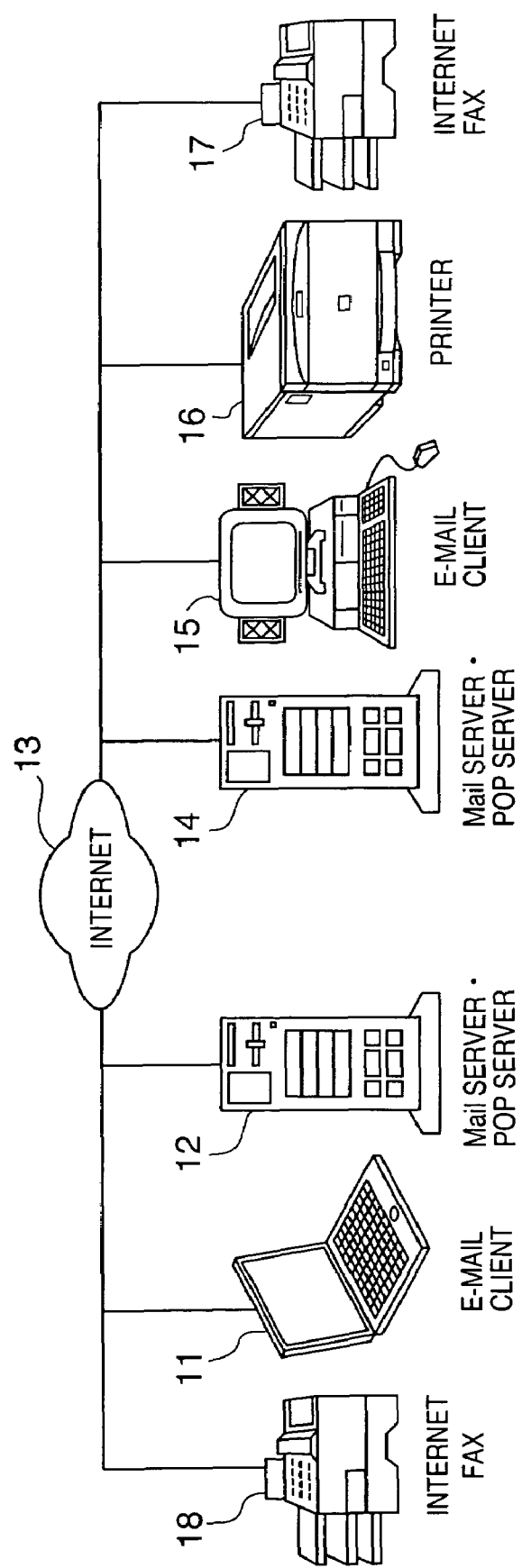
FIG. 13 is a schematic diagram showing a conventional e-mail system.

FIG. 11 is a flow chart of an "Internet FAX sending mode". The "Internet FAX sending mode" is a function of inputting sending information including a date, time, destination address, source information, comment, and the like, reading image data from a scanner, creating a TIFF file that complies with the Internet FAX specifications by combining sending information image data created based on the sending information with the read image data, attaching the TIFF file to an e-mail message, and sending the image data to the Internet FAX 17 that complies with the Internet FAX specifications.

The flow chart of the "Internet FAX sending mode" will be explained below. In the flow chart to be described below, the same step numbers denote the steps that execute the same processes as those described in FIG. 10, and a description of such processes will be omitted. If the Internet FAX sending mode is launched in step S370, setup values for reading image data are set in the reader unit 1. Parameters that can be set as setup values are the same as those in, e.g., the e-mail sending mode, but the resolution is fixed at 200×200 dpi, a read mode is fixed to be a monochrome mode, and a color read mode is inhibited.

In step S352, the Internet FAX 20 instructs to input sending information required for sending image data such as a date, time, destination address, source information, comment, and the like at the console 115 as in the e-mail sending mode. In step S352, if two locations, i.e., "tokyo@tokyo.ganon.co.jp (Tokyo home office)" and "oosaka@oosaka.ganon.co.jp (Osaka branch office)" are selected as destinations, "2" is set in the number of destinations.

In step S353, a document set on the platen glass 102 of the reader unit 1 is scanned to read image data.

In step S371, the Internet FAX 20 instructs to execute an image padding process. In this case, if a document having a document size other than A4 is set on the platen glass 102, the Internet FAX 20 instructs to execute a resolution conversion process for zooming the document size to the A4 size, and to execute a padding process for adding white pixels so that the number of pixels in the main scan direction equals 1,728.

Note that the console 115 has a user mode (not shown). As one item of the user mode, a sending information image data (header) paste mode for selecting whether "to paste sending information image data (header) on image data" or not can be selected. Note that "to paste sending information image data (header) on image data" means a composition method setting mode for combining image data and sending information image data obtained from the sending information.

If the step "to paste sending information image data (header) on image data" mode is selected, a setting mode for "externally or internally appending sending information image data (header) to image data" can be selected. "Internally appending sending information image data (header) to image data" is a setting mode for superposing and combining image data and sending information image data so that sending information is output to overlap a predetermined position on an image obtained by outputting the image data. "Externally appending sending information image data (header) to image data" is a setting mode for combining the image data and sending information image data at neighboring positions so that sending information is output at a predetermined position outside an image obtained above the image. FIG. 12A shows an example of a sending information image (header image) upon outputting sending information image data. FIG. 12A shows a sending information image (header image) that describes the sending data, sending time, an e-mail address of a sender as an example of source information, the nickname of a recipient (for example, "Tokyo home office" is used as a destination of the first sending process) as an example of destination information, page number, and the like. FIG. 12B shows a sending information image (header image) that describes the sending data, sending time, an e-mail address of a sender as an example of source information, the nickname of a recipient (for example, "Osaka branch office" is used as a destination of the first sending process) as an example of destination information, page number, and the like.

In step S372, the sending information image data paste mode as the user mode is checked. If it is determined that "sending information image data (header) is not pasted on image data", the flow jumps to step S354 without executing any paste process of sending information image data. On the other hand, if it is determined in step S372 that "sending information image data (header) is pasted on image data", the flow advances to step S373. If the sending information image data (header) appending mode is set to "externally append sending information image data (header)" in step S373, the flow advances to step S374 to execute a sending information image data (header) external appending process.

On the other hand, if the sending information image data (header) appending mode is set to "internally append sending information image data (header)" in step S373, the flow advances to step S375 to execute a sending information image data (header) internal appending process. After that, the flow advances to step S354 to execute an image encode process.

The flow then advances to step S355 to create a TIFF file, and an e-mail header and MIME information are created in step S356. Furthermore, the flow advances to step S357 to execute a BASE64 encode process. The flow then advances to step S358 to execute an SMTP sending process, thus sending an e-mail message attached with image data that contains sending information image data to "tokyo@tokyo.ganon.co.jp (Tokyo home office)".

In step S376, the number of destinations is decremented by 1 after the e-mail message attached with image data that contains sending information image data has been sent, and the flow advances to step S377. If the number of destinations is zero in step S377, the series of operations end at step S378. On the other hand, if the initial number of destinations is 2 and the number of destinations decremented by 1 is not zero as in the above example, the flow returns to step S372 to repeat the same operations as in the first sending process.

In the second sending process, in place of the sending information image data of the sending information image (header image) shown in FIG. 12A, sending information image data of a sending information image (header image) that includes the recipient's nickname "Osaka branch office" is appended, and image data containing that sending information image data is sent to "oosaka@oosaka.ganon.co.jp (Osaka branch office)".

In the example described using FIG. 11, image data containing different sending information image data is sent to a plurality of destinations by repeating a method of creating image data containing sending information image data for each destination, creating an e-mail message to be sent, and attaching the image data containing the sending information image data to the created e-mail message.

However, the method of sending image data containing different sending information image data to a plurality of destinations is not limited to the above specific method. For example, image data containing different sending information image data may be sent to a plurality of destinations by creating image data containing corresponding sending information image data for each destination, creating an e-mail message, attaching the image data containing the sending information image data of each destination to the e-mail message, and repetitively sending the e-mail message.

When image data that does not contain any header image information is to be sent to a plurality of destinations, an e-mail message for a plurality of destinations is created, and image data is attached to the e-mail message for the plurality of destinations, thus sending image data that does not contain any header image information to the plurality of destinations.

In the above embodiment, the communication pattern of the Internet FAX has been explained using a Simple Mode. Alternatively, other communication methods such as a real-time mode, full mode, and the like that require negotiation may be used. In the above description, TCP/IP is used as the network communication protocol. Alternatively, the same effect can be obtained using other communication protocols such as IPX/SPX as a network OS, Apple Talk, and the like.

Furthermore, BASE64 is used as the e-mail decode method. Alternatively, uuencode, BinHex, and the like may be used. Furthermore, in the above description, a TIFF file is printed. Alternatively, other image file format such as JPEG (joint photographic experts group), GIF (graphics interchange format), PICT, BMP (bitmap), and the like may be used. Also, the image compression format is not limited to MH, but MR, MMR, JBIG, RLE, and the like may be used. In the above description, a hard disk is used as the information recording device, but the same effect can be obtained using other recording devices such as a semiconductor memory, optical disk, and the like.

In the above description, a communication apparatus that sends an e-mail message attached with image data containing sending information image data or the like using the Internet has been exemplified. However, the path of the image data sent by the communication apparatus is not limited to the Internet, but other packet communication networks such as a LAN and the like may be used.

As described above, the Internet FAX 20 of this embodiment comprises the second mode for setting an arbitrary one of a plurality of read resolutions upon reading image data from a scanner, reading image data in accordance with the set resolution, and sending e-mail message attached with the read image data having the arbitrary resolution, and the first mode for sending an e-mail message attached with image data containing sending information image data obtained by appending sending information image data such as a date, time, sending information, destination information, and the like to image data read at a predetermined resolution.

In the second mode, since no header image information such as a date, time, source information destination information, and the like is appended to the read image data, a plurality of read resolutions can be selected while avoiding characters of header image information from becoming unnaturally large/small, and from falling outside a print sheet.

In the first mode, a read resolution which is high enough to be used ordinarily can be selected, and sending information image data such as a date, time, source information destination information, and the like can be appended to the read image data. Also, since the first mode can be switched not to append any header upon sending, many choices can be provided to users, thus improving convenience.

Furthermore, in the first mode, whether header image information is appended outside an image or above the uppermost portion of an image can be switched upon sending an image. When header image information is appended outside the image, the image size increases by the header image information but the source image can remain the same. When the header information is appended to be superposed on the uppermost portion of the image, the image size remains the same.

Note that the Internet FAX 20 of this embodiment comprises the first and second modes, as described above, and can selectively use these first and second modes. However, the Internet FAX 20 is not limited to the above specific arrangement. For example, the Internet FAX 20 may comprise the first or second mode alone.

[Other Embodiments]

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

To recapitulate, according to the present invention, a communication apparatus and method which comprise a second mode in which an image read condition can be selected from a plurality of read conditions, and an e-mail message attached with image data which is read at an arbitrary resolution according to the selected condition and has an indefinite number of pixels can be sent, and a first mode in which an image is read at a predetermined resolution, header information such as a date, time, sending information destination information, and the like is appended to image data obtained by converting the read image data into image data having a predetermined number of pixels, and an e-mail message appended with the image data containing the sending information image data can be sent, can be provided.

Also, according to the present invention, a communication apparatus and method which can send image data, which is obtained by reading an image under a predetermined condition, and converting the read image into image data into image data having a predetermined number of pixels, while describing a date, time, source e-mail address, destination name, and the like in that image data can be provided.

As many apparently widely different embodiments of the present invention can be made without departing from the spirit and scope thereof, it is to be understood that the invention is not limited to the specific embodiments thereof except as defined in the claims.

What is claimed is:

1. A communication apparatus for transmitting an e-mail message to which an image data is attached via a computer network, comprising:

image data acquisition means for acquiring image data having a predetermined resolution;

sending information acquisition means for acquiring sending information of the image data including destination information of the image data;

pasting means for pasting the sending information to the image data thereby generating composite image data;

generation means for generating an e-mail message by attaching the composite image data;

sending means for sending the e-mail message attached with the composite image data; and repeating means for repeating the acquiring sending information, the pasting, the generating and the sending procedures for at least two different destinations separately so that each of the composite image data received at each of the at least two different destinations; is pasted with each respective destination information.

2. The communication apparatus of claim 1, further comprising conversion means for converting the acquired image data into image data having a predetermined number of pixels.

3. The apparatus according to claim 2, further comprising selection means for selecting image data to be sent by said sending means from the composite image data and the converted image data.

4. The apparatus according to claim 2, wherein when there are a plurality of pieces of sending information of the image data, said generation means generates a plurality of sending information image data using the plurality of pieces of sending information respectively, said sending means generates composite image data of the plurality of sending information image data and the converted image data, and sends in turn on the basis of the individual sending information.

5. The apparatus according to claim 2, wherein when the image data does not have a predetermined image size, said conversion means converts the image data into the predetermined image size by converting the resolution of the image data, and when the number of pixels of the image data in a predetermined direction is smaller than a predetermined number of pixels, said conversion means converts the image data into an image data having the predetermined number of pixels by padding white pixels to the image data.

6. The apparatus according to claim 2, wherein said sending means generates the composite image data by superposing the sending information image data on the converted image data or places the sending information image data next to the converted image data.

7. The apparatus according to claim 1, wherein said image data acquisition means has image reading means capable of reading an image at a plurality of read resolutions, and the predetermined resolution is selected from the plurality of read resolutions.

8. The apparatus according to claim 1, wherein said sending information acquisition means generates the sending information image data further using at least one of predetermined source information, destination information, a date, a time, and comment.

9. A communication method for transmitting an e-mail message to which an image data is attached via a computer network, comprising:
   acquiring image data having a predetermined resolution;
   acquiring sending information of the image data including destination information of the image data;
   pasting the sending information to the image data thereby generating composite image data;
   generating an e-mail message by attaching the composite image data;
   sending the e-mail message attached with the composite image data; and
   repeating said acquiring sending information, said pasting, said generating and said sending steps for at least two different destinations separately so that each of the composite image data received at each of the at least two different destinations is pasted with each respective destination information.

10. The method according to claim 9, wherein the image data acquisition step has the image reading step capable of reading an image at a plurality of read resolutions, and the predetermined resolution is selected from the plurality of read resolutions.

11. The method according to claim 9, wherein the acquiring sending information step includes the step of generating the sending information image data further using at least one of predetermined source information, destination information a date, a time, and comment.

12. The communication method of claim 9, further comprising a conversion step of converting the acquired image data into image data having a predetermined number of pixels.

13. The method according to claim 12, wherein the sending step includes the step of generating the composite image data by composition which superposes the sending information image data on the converted image data or places the sending information image data next to the convened image data.

14. The method according to claim 12, further comprising the selection step of selecting image data to be sent in the sending step from the composite image data and the converted image data.

15. The method according to claim 12, wherein the generation step includes the step of generating, when there are a plurality of pieces of sending information of the image data, a plurality of sending information image data using the plurality of pieces of sending information respectively, and
   the sending step includes the step of generating composite image data of the plurality of sending information image data and the converted image data, and sending in turn on the basis of the individual sending information.

16. The method according to claim 12, wherein the conversion step includes the step of converting, when the image data does not have a predetermined image size, the image data into a different image size by convening the resolution of the image data, and converting, when the number of pixels of the image data in a predetermined direction is smaller than a predetermined number of pixels, the image data into the image data having the predetermined number of pixels by padding white pixels to the image data.

17. A computer-readable storage medium that stores a control program communication apparatus for transmitting an e-mail message to which an image data is attached via a computer network, said control program comprising:
   code of acquiring image data having a predetermined resolution;
   code of acquiring sending information of the image data including destination information of the image data;
   code of pasting the sending information to the image data thereby generating composite image data;
   code of generating an e-mail message by attaching the composite image data;
   code of sending the e-mail message attached with the composite image data; and
   code of repeating said acquiring sending information, said pasting, said generating and said sending steps for at least two different destinations separately so that each of the composite image data received at each of the at least two different destinations is pasted with each respective destination information.

18. The storage medium of claim 17, further comprising a conversion step code of converting the acquired image data into image data having a predetermined number of pixels.

19. A communication apparatus for transmitting an e-mail message to which an image data is attached via a computer network, comprising:
   mode detection means for detecting whether a first or second operation mode is designated;
   image data acquisition means for acquiring image data having a predetermined resolution;
   sending information acquisition means for acquiring sending information of the image data including destination information of the image data;
   pasting means for pasting the sending information to the image data thereby generating composite image data;
   generation means for, when the first operation mode is detected, generating a first e-mail message by attaching the composite image data;
   sending means for, when the first operation mode is detected, sending the first e-mail message attached with the composite image data, and for, when the second operation mode is detected, generating a second e-mail message on the basis of the sending information, and sending the second e-mail message attached with the image data without pasting the sending information to the image data; and
   repeating means for repeating the acquiring sending information, the pasting, the generating a first e-mail message, the sending the first e-mail message, the generating a second e-mail message, and the sending the second e-mail message procedures for at least two different destinations separately so that each of the composite image data received at each of the at least two different destinations is pasted with each respective destination information.

20. The apparatus according to claim 19, wherein said sending information acquisition means generates the sending information image data further using at least one of predetermined source information, destination information, a date, a time, and comment.

21. The apparatus according to claim 19, wherein when the second operation mode is detected and there are a plurality of pieces of sending information of the image data, said sending means generates one e-mail message on the basis of the plurality of pieces of sending information and sends the e-mail message attached with the image data.

22. The apparatus according to claim 19, wherein said image data acquisition means has image reading means capable of reading an image at a plurality of read resolutions, and the predetermined resolution is selected from the plurality of read resolutions.

23. The communication apparatus of claim 19, further comprising conversion means for converting the acquired image data into image data having a predetermined number of pixels.

24. The apparatus according to claim 23, wherein said sending means generates the composite image data by composition which superposes the sending information image data on the converted image data or places the sending information image data next to the converted image data.

25. The apparatus according to claim 23, further comprising selection means for selecting image data to be sent by said sending means from the composite image data and the converted image data.

26. The apparatus according to claim 23, wherein when the first operation mode is detected and there are a plurality of pieces of sending information of the image data, said generation means generates a plurality of sending information image data using the plurality of pieces of sending information respectively, and said sending means generates composite image data of the plurality of sending information image data and the converted image data, and sends in turn on the basis of the individual sending information.

27. The apparatus according to claim 23, wherein when the image data does not have a predetermined image size, said conversion means converts the image data into a different image size by converting the resolution of the image data, and when the number of pixels of the image data in a predetermined direction is smaller than a predetermined number of pixels, said conversion means converts the image data into the image data having the predetermined number of pixels by padding white pixels to the image data.

28. A communication method for transmitting an e-mail message to which an image data is attached via a computer network, comprising:
 detecting whether a first or second operation mode is designated;
 acquiring image data having a predetermined resolution;
 acquiring sending information of the image data including destination information of the image data;
 pasting the sending information to the image data thereby generating composite image data;
 generating, when the first operation mode is detected, a first e-mail message by attaching the composite image data; and
 when the first operation mode is detected, sending the first e-mail message attached with the composite image data, and of generating, when the second operation mode is detected, a second e-mail message on the basis of the sending information, and sending the second e-mail message attached with the image data without pasting the sending information to the image data; and
 repeating said acquiring sending information, said pasting, said generating a first e-mail message, said sending the first e-mail message, said generating a second e-mail message, and said sending the second e-mail message steps for at least two different destinations separately so that each of the composite image data received at each of the at least two different destinations is pasted with each respective destination information.

29. The method according to claim 28, wherein the image data acquisition step has an image reading step capable of reading an image at a plurality of read resolutions, and a predetermined resolution is selected from the plurality of read resolutions.

30. The method according to claim 28, wherein the acquiring sending information step includes a step of generating the sending information image data further using at least one of predetermined source information, destination information, a date, a time, and comment.

31. The communication method of claim 28, further comprising a conversion step of converting the acquired image data into image data having a predetermined number of pixels.

32. The method according to claim 31, wherein the sending step includes a step of generating the composite image data by composition which superposes the sending information image data on the converted image data or places the sending information image data next to the converted image data.

33. The method according to claim 31, further comprising the selection step of selecting image data to be sent in the sending step from the composite image data and the converted image data.

34. The method according to claim 31, wherein the generation step includes the step of generating, when the first operation mode is detected and there are a plurality of pieces of sending information of the image data, a plurality of sending information image data using the plurality of pieces of sending information respectively, and the sending step includes the step of generating composite image data of the plurality of sending information image data and the converted image data, and sending in turn on the basis of the individual sending information.

35. The method according to claim 31, wherein the conversion step includes a step of converting, when the image data does not have a predetermined image size, the image data into a different image size by converting the resolution of the image data, and converting, when the number of pixels of the image data in a predetermined directions smaller than a predetermined number of pixels, the image data into the image data having a predetermined number of pixels by padding white pixels to the image data.

36. The method according to claim 28, wherein the sending step includes the step of generating, when the second operation mode is detected and there are a plurality of pieces of sending information of the image data, one e-mail message on the basis of the plurality of pieces of sending information and sending the e-mail message attached with the image data.

37. A computer readable storage medium that stores a control program communication apparatus for transmitting an e-mail message to which an image data is attached via a computer network, said control program comprising:
 code of detecting whether a first or second operation mode is designated;
 code of acquiring image data having a predetermined resolution;

code of acquiring sending information of the image data including destination information of the image data;

code of pasting the sending information to the image data thereby generating composite image data;

code of generating, when the first operation mode is detected, a first e-mail message by attaching the composite image data;

code of, when the first operation mode is detected, sending the first e-mail message attached with the composite image data, and of generating, when the second operation mode is detected, a second e-mail message on the basis of the sending information, and sending the second e-mail message attached with the image data without pasting the sending information to the image data; and repeating said acquiring sending information, said pasting, said a first e-mail message, said sending the first e-mail message, said generating a second e-mail message, and, said sending the second e-mail message steps for at least two different destinations separately so that each of the composite image data received at each of the at least two different destinations is pasted with each respective destination information.

38. The storage medium of claim 37, further comprising a conversion step code of converting the acquired image data into image data having a predetermined number of pixels.

* * * * *

UNITED STATES PATENT AND TRADEMARK OFFICE
CERTIFICATE OF CORRECTION

PATENT NO. : 7,119,915 B2  Page 1 of 1
APPLICATION NO. : 09/790108
DATED : October 10, 2006
INVENTOR(S) : Tonegawa It is certified that error appears in the above-identified patent and that said Letters Patent is hereby corrected as shown below:

<u>In the Claims:</u>

In claim 13 (col. 17, line 53), please replace "convened" with --converted--.

In claim 14 (col. 17, line 55), please replace "the selection" with --selection--.

In claim 16 (col. 18, line 4), please replace "convening" with --converting--.

In claim 17 (col. 18, line 11), please replace "program communication" with --program for a communication--.

In claim 35 (col. 20, line 50), please replace "directions" with --direction is--.

In claim 37 (col. 20, line 61), please replace "program communication" with --program for a communication--.

In claim 37 (col. 22, line 2), please replace "said a first" with --said generating a first--.

Signed and Sealed this

Twenty-sixth Day of December, 2006

JON W. DUDAS
*Director of the United States Patent and Trademark Office*